Dec. 27, 1938.  B. C. WOODFORD  2,141,585
VACUUM FEEDER AND PADDLE WHEEL THEREFOR
Filed June 3, 1937
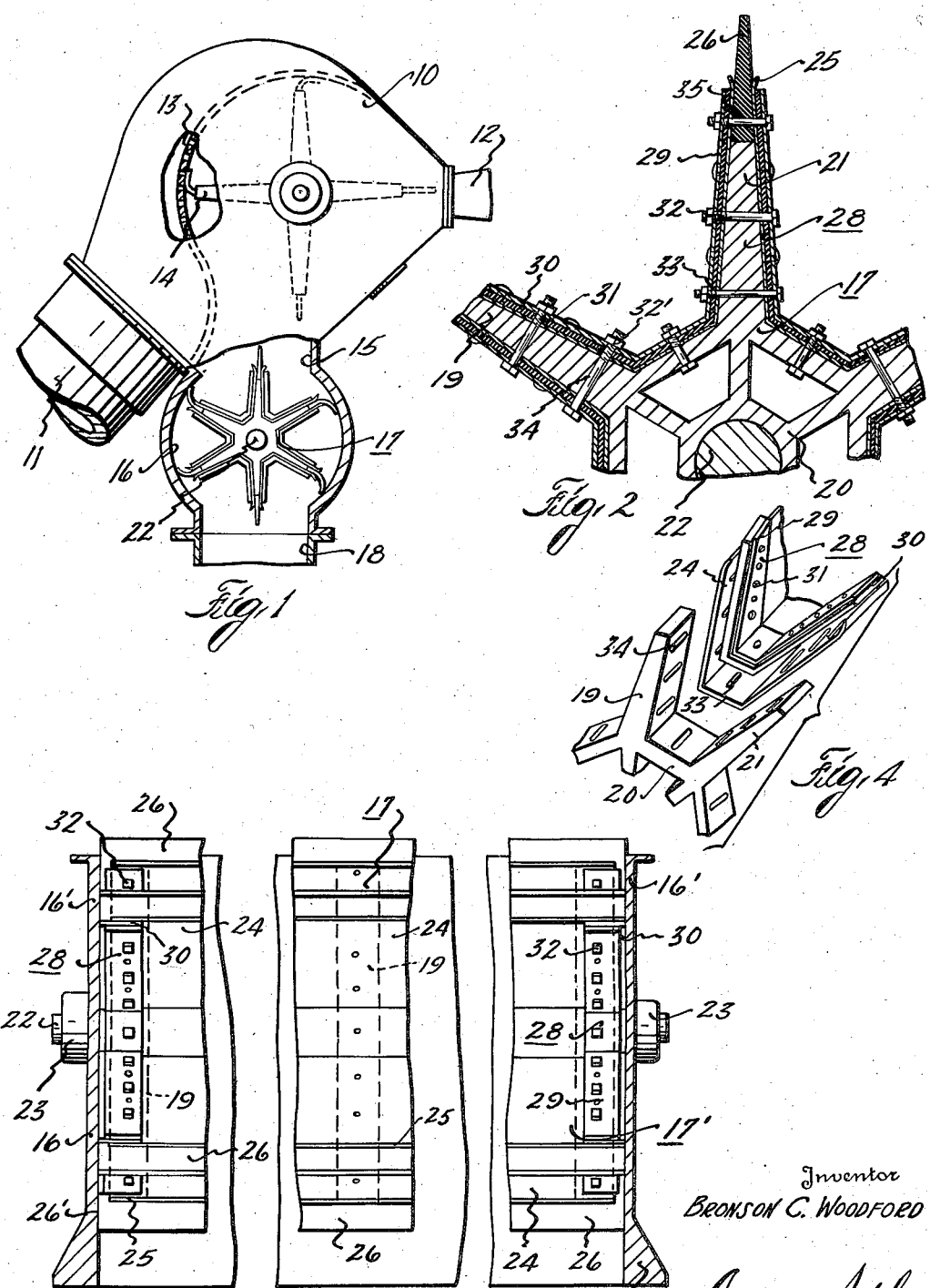

Patented Dec. 27, 1938

2,141,585

UNITED STATES PATENT OFFICE 2,141,585

VACUUM FEEDER AND PADDLE WHEEL THEREFOR

Bronson C. Woodford, Dallas, Tex., assignor to The Murray Company, Dallas, Tex., a corporation of Texas Application June 3, 1937, Serial No. 146,227

2 Claims. (Cl. 19—75)

This invention relates to new and useful improvements in vacuum feeders and paddle wheels therefor.

One object of the invention is to provide a feeder particularly adapted for use in a cotton separator and including an improved vacuum paddle wheel for removing the cotton from the separator.

An important object of the invention is to provide an improved vacuum paddle wheel having longitudinal flexible logging for engaging the wall of the feeder chamber as said wheel rotates, with means carried by the wheel for sealing off between the ends of said wheel and the end walls of the chamber, whereby a vacuum is maintained and escape of air past the wheel during its rotation is prevented.

Another object of the invention is to provide an improved rotatable vacuum paddle wheel having radial arms, with an improved sealing element located between each arm at the ends of the wheel; said element being adjustable with relation to the wheel, whereby wear of the member may be readily compensated for and the element may be maintained in sealing engagement with the end wall of the feeder chamber at all times.

A further object of the invention is to provide an improved paddle wheel of the character described, which is simple and sturdy in construction and which is so arranged that its sealing elements may be readily adjusted, removed or replaced without removing the wheel from the feeder chamber.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view partially in elevation and partially in section of a separator, showing a paddle wheel, constructed in accordance with the invention, within the feeder chamber thereof, Figure 2 is an enlarged, partial, transverse, sectional view of the wheel, Figure 3 is a view partly in elevation and partly in section of the paddle wheel mounted within the chamber, and Figure 4 is a partial isometric view of one end of the wheel.

In the drawing, the numeral 10 designates an air-tight casing or housing which is preferably constructed of sheet metal, or other suitable material. An enlarged air conduit 11, having a suitable cotton suction fan (not shown) at its outer end, is connected to the lower end of the rear wall of the housing and communicates with the interior thereof. A cotton inlet 12 is connected to the forward end of the housing and manifestly the cotton is drawn through the inlet into said housing by the draft air created through the suction fan within the conduit 11. A perforated screen 13 is located within the housing, as is a rotatable wiping reel 14 and the arrangement serves to separate the air from the cotton which is introduced or pulled into the housing. The details of this housing or casing which forms a separator, is clearly disclosed in my co-pending application, filed June 24, 1936, Serial No. 87,020, and forms no part of the present invention, being described merely for the sake of clarity.

The lower end of the housing is provided with a transverse opening 15 which extends the full length thereof whereby the cotton falling from the housing may escape therethrough. A discharge spout or feeder chamber 16, which has a general circular shape in cross-section, is connected to the discharge opening 15 so as to receive the cotton dropping therethrough. A vacuum paddle wheel 17 is rotatably mounted within the discharge spout or chamber 16 and is constructed so as to prevent the escape of air through said spout or chamber while permitting the discharge of cotton from the housing 10. A suitable outlet conductor 18 which may lead to a conveyor (not shown) is connected to the lower end of the spout or chamber 16.

It is apparent that to obtain the efficient feeding of the cotton dropping from the housing 10 to the conductor 18, the paddle wheel 17 must be efficiently sealed off from the walls of the chamber or spout 16. In order to accomplish this, the paddle wheel is constructed as is clearly shown in Figures 2 to 4 and includes a plurality of spiders 19, each of which comprise a central hub 20 having radial arms 21 extending therefrom. The spiders are shown as three in number, being spaced throughout the length of the wheel 17, but it is noted that any desired number of these spiders may be employed. A transverse shaft 22 which has its ends mounted in bearings 23 located on the end walls 16' of the chamber 16, extends through the hub 20 of the spiders 19, and said hub may be suitably secured in any manner on said shaft. The shaft is rotated through gearing (not shown) or other means and obviously, since the spiders are mounted thereon, they will rotate therewith.

The spiders 19 are connected together by a plurality of V-shaped partitions 24 which extend transversely throughout the length of the chamber 16. As is clearly shown in Figure 2, one of the partitions 24 is located between adjacent arms of the spider. Since the spiders have been shown as having six radial arms 21, it will be manifest that six V-shaped partitions 24 are necessary. The partitions may be secured to the spiders in any suitable manner as by rivets or bolts but are preferably fastened thereto in the manner hereinafter described. The outer longitudinal edges of the partitions 24 extend beyond the end of the arms 21 and are curved outwardly to form longitudinal lips 25. Flexible wipers 26 are secured or clamped between the lips 25 formed by the outer edges of the partitions 24 and are clearly shown in Figure 2. These wipers engage the walls of the chamber or spout 16 as the paddle wheel 17 is rotated therein. Each wiper extends substantially throughout the length of the paddle wheel whereby its outer longitudinal edge is in constant engagement with the wall of the chamber. The end 26' of each wiper is extended beyond the end spiders 19, whereby it will engage the end wall 16' of the chamber (Figure 3) and thus seal off at this point. Therefore, it will be evident that the wipers 26 not only engage the side wall of the chamber 16, but have their ends engaging the end wall 16'.

Since each wiper 26 is comparatively narrow in width, the end of said wiper engaging the end wall 16' acts to seal only the outer end of each radial arm 21 of the paddle wheel 17. In order to seal off the space between the remainder of the arms 21 and the end walls 16', an end sealing element 28 is provided. This element is clearly shown in Figure 2 and comprises a V-shaped strap or bar 29 which is shaped to follow the contour of the V-shaped partitions 24. A flexible sealing member 30 is secured by rivets or otherwise, to the underside of the strap or bar 29. The width of the member 30 is greater than the width of the bar 29, whereby it extends beyond the outer edge of said bar, as is clearly shown in Figure 3. One of the sealing elements 28 is provided for each end of each partition 24 and since it conforms to the shape of said partition, it will overlie the same (Figure 2) when in position thereon. Bolt openings 31 are formed in the strap or bar 29 and in the sealing element 30, whereby bolts 32 may pass therethrough. Each partition is provided with horizontal slots 33 which register with the openings 31 in the element 28, while similar slots 34 are formed in the arms 21 of the spider. Therefore, the bolts 32 may extend through the openings 31 in one of the sealing elements 28, then through the slots 33 in the partition 24, then through the opening or slot 34 in the spider arm, and finally through the partition and sealing element on the opposite side of the spider arm. Nuts 32' are threaded on the outer ends of the bolts 32, whereby the parts are all secured together by said bolts. The outermost bolts 32 on each radial arm 21 may extend through openings 35 in the inner end of the flexible wipers 26, whereby said bolts may serve to hold said wipers in position on the wheel 17. It is pointed out that although it is preferable to utilize the bolts which secure the sealing element 28 on the wheel 17, it is not essential to do so as the partitions, wipers, and spiders could be fastened by rivets or otherwise, in which case the bolts 32 would merely fasten the elements 28 to the partitions 24.

Since the sealing member 30 is of a greater width than the bar or strap 29 to which it is secured, it will be seen that the outer edge of said sealing member may engage the end wall 16' of the chamber or spout 16 (Figure 3), whereby the space between the end of the paddle wheel 17 and the end wall 16' is sealed off. It is noted that the upper end of the sealing element 28 overlaps the inner or lower end of the wipers 26, whereby a continuous sealing member from the outer edge of the wipers 26 to the inner end of the element 28 which is at the hub 20 of the spiders 19, is had. In the event that the sealing member 30 becomes worn through use, it is only necessary to loosen the nuts 32' on the bolts 32, which will permit the entire sealing element, as well as the bolts 32 extending through the openings 31 therein, to be moved within the slots 33 of the partitions 24 and the slots 34 of the spider arms 31, whereby this wear may be compensated for and a sealing off of the space maintained at all times.

From the above, it will be seen that a simple and durable paddle wheel is provided. The wheel is constructed of a minimum number of parts and is readily assembled by bolting the various parts together. The wipers 26 may be easily replaced when they become worn so as to assure a positive sealing engagement between the wipers and the wall of the chamber or spout 16 at all times. The element 28 may be adjusted readily so as to seal off the space between the ends of the wheel 17 and the end wall 16' of the chamber. When the sealing member 30 becomes so worn that further adjustment thereof is ineffective in maintaining a seal, it is only necessary to remove the entire element 28 and replace the same with a new one.

What I claim and desire to secure by Letters Patent is:

1. A paddle wheel for a vacuum feeder including, a rotatable shaft, an elongate member secured on the shaft and having a plurality of radially directed arms, longitudinal flexible wipers carried by the outer ends of said arms, a plurality of sealing elements at each end of the member, each element being substantially V-shaped so as to fit between adjacent arms of the member and including a flexible strip which extends beyond the end of the member when the element is in position thereon, and means for varying the position of said elements on the member to compensate for wear of the flexible strips thereof.

2. A paddle wheel for a vacuum feeder including, a rotatable shaft, an elongate member secured on the shaft and having a plurality of radially directed arms, longitudinal flexible wipers carried by the outer ends of said arms, a plurality of sealing elements at each end of the member, each element being substantially V-shaped so as to fit between adjacent arms of the member and including a flexible strip which extends beyond the end of the member when the element is in position thereon, means for varying the position of said elements on the member to compensate for wear of the flexible strips thereof, the member having elongate slots therein and the sealing element having bolt holes registering with said slots, and bolts extending through said openings and said slots to fasten the elements to the member, the slots permitting the elements to be secured to the member in various positions to compensate for wear of the flexible strips of the sealing elements.

BRONSON C. WOODFORD